Oct. 20, 1959 — L. D. STATHAM — 2,909,743
ELECTRICAL STRAIN WIRE TRANSDUCER
Filed Dec. 15, 1955 — 3 Sheets-Sheet 2

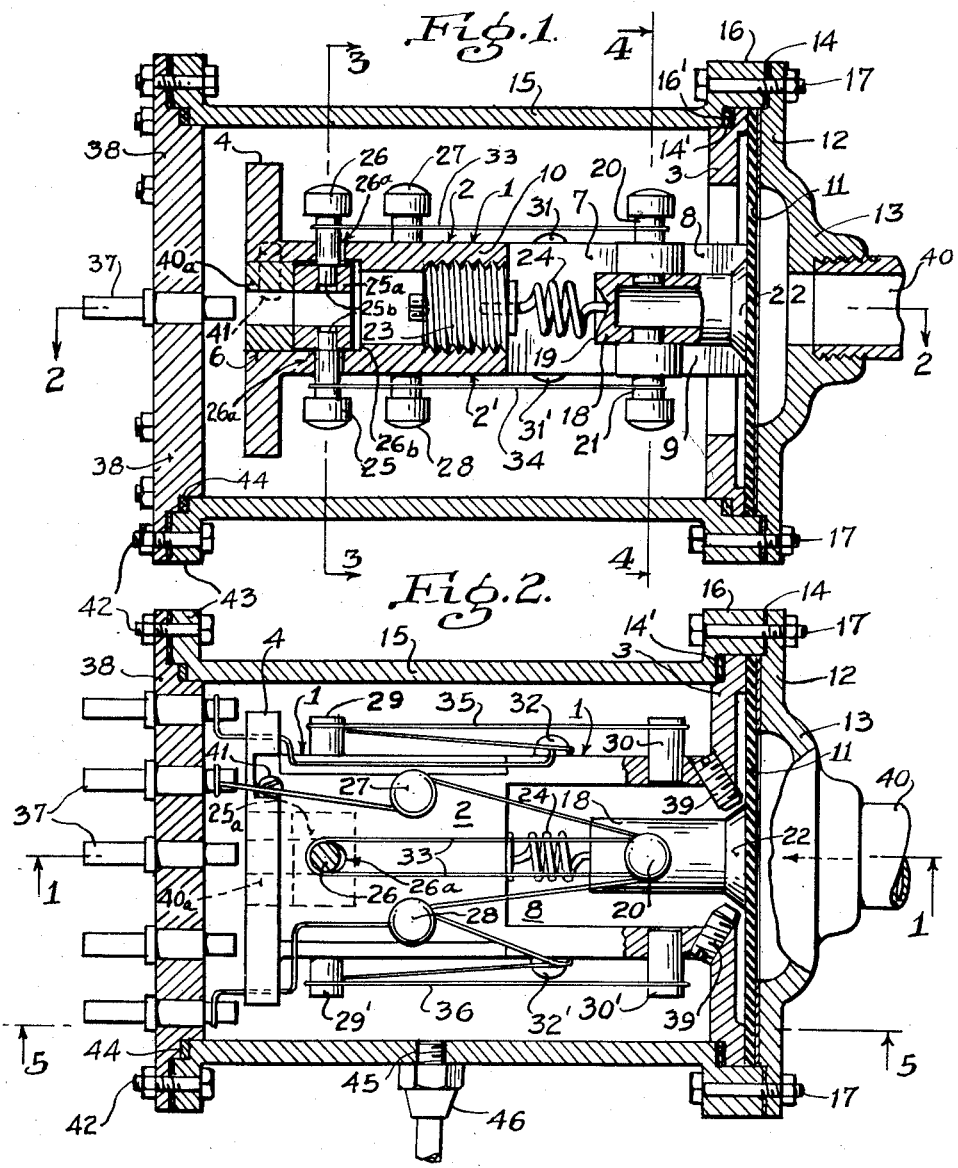

Louis D. Statham
INVENTOR

BY Philip Subkow
ATTORNEY.

Oct. 20, 1959  L. D. STATHAM  2,909,743
ELECTRICAL STRAIN WIRE TRANSDUCER
Filed Dec. 15, 1955  3 Sheets-Sheet 3

INVENTOR
LOUIS D. STATHAM
BY Philip Sarkar
ATTORNEY.

ELECTRICAL STRAIN WIRE TRANSDUCER

Louis D. Statham, Beverly Hills, Calif., assignor to Statham Instruments, Inc., Los Angeles, Calif., a corporation of California Application December 15, 1955, Serial No. 553,302

17 Claims. (Cl. 338—4)

This invention relates to an electrical strain wire transducer. Transducers in which a force summing means varies the tensile stress on the wire to cause a variation in the electrical resistance of the wire which is thus a measure of the motion of or of a force imposed on a force summing means are well known. The force summing means may be a rod, diaphragm, or weight, or any other member subject to motion in space as a result of forces or motions imposed thereon. The force summing means is the medium for summing up all the forces simultaneously applied to the force summing means and transmitting the same to the wire. When the force summing means is a rod, the transducer may be a displacement measuring device; or, where the force summing means is a diaphragm, the transducer may be a pressure gauge; and, where the force summing means is a weight, it may be a velometer, accelerometer, or velocimeter, as the case may be. The foregoing is intended as illustrative and not as exhaustive of the forms of force summing means and of the applications of strain wire transducers.

In the conventional strain wire gauge in which one end of the wire is connected to the force summing means and the other end of the wire is connected to a fixed point, it is necessary to limit the motion of the force summing means so that it does not cause a strain in the wire such that the stress exceeds the elastic limit of the wire. For wires of steel or constantan, which are most generally used in this art, such strain wire transducers are designed to limit the total strain to be produced in the wires to be not greater than 0.0015 in./in. in a zero centered instrument (i.e. with an initial strain of 0.0015 inch per inch and a total maximum strain of 0.003 inch per inch). The corresponding stress is far below the actual elastic limit of the wire, and this limit of strain is used in order to introduce a safety factor of about 1.3 to 1.5, depending on the wire employed and other practical considerations. Even when employing a permissible total strain of 0.003 in./in., it is the practice, particularly in small gauges such as the so-called subminiature gauges now commercially sold, to set stops to limit the motion of the force summing means so that the wire is stretched only eighty percent of the permissible additional extension set by the factor of 0.0015 in./in. This factor of safety is necessary because the stops which are used cannot be set with an accuracy which will permit the strain to create a stress which would be up to, but not beyond, the elastic limit, and also because the stops cannot be considered absolutely rigidly defined surfaces.

Stops are usually set screws having a given modulus of elasticity; and the force summing means and the framework in which the transducer is mounted are also elastic members, i.e., the metal itself has elasticity. Consequently, an inaccuracy is introduced equal to the sum of the above elastic effects. The wire may thus be strained an amount greater than that which is determined by the position of theoretically rigid stops set at the limits previously referred to.

Another difficulty present in the prior art designs results from the elasticity of the metal employed in the transducer. As the force summing means approaches the stop and exerts a force against the stop, the motion of the force summing means no longer produces the same changes in stress in the wire per unit of movement of the force summing means as it did during the approach to the stops, i.e. the proportionality of strain exerted in the wire to the force exerted on the force summing means will not be the same after the force summing means starts to stress the stops, and is in fact less than during the approach to the stops. This is a result of the compressibility of the transducer frame and stops described above. Consequently, during this latter portion of the motion of the force summing means, the variation in strain in the wire is a non-linear function of the movement of the force summing means. Therefore, in order to obtain a unit with true linearity, the instrument must be used in the range below that to which the instrument could theoretically respond.

As a result of all these factors, the instrument designed employing stops must be made oversize for the service for which it is designed.

It is one of the objects of my invention to design a variable electrical resistance strain wire transducer which can obtain essentially the maximum available safe total strain from a wire of given length without exceeding the safe strain, and could be strained to the above gauge limits with true linearity of the relationship of the strain in the wire to the motion of the force summing means.

In my previous applications, Serial Nos. 354,294, filed May 11, 1953, now Patent No. 2,751,476, and No. 354,295, filed May 11, 1953, now Patent No. 2,783,342, and Patent No. 2,455,883, issued December 7, 1948, I have developed instruments having a high natural frequency by reducing the mass of the transducer which is attached to the force summing means, and I have obtained that result by attaching a strain wire to the force summing means and to a fixed point, so that the mass which is added to the force summing means results from the attachment of the wire to the force summing means and from the mass of the wire itself. Such transducers had the advantage that they eliminated armatures, linkage pins, and other mechanical connecting means.

It is a further object of my invention to modify the above design in order to produce an electrical strain wire transducer in which means are incorporated to prevent further strain on the wires when the latter have been strained to a predetermined safe strain limit.

Yet another object is the provision of a strain wire transducer in which conventional stops for preventing overload of the strain wire are eliminated and are replaced by more efficient means to protect the strain wire from becoming overloaded.

Other objects of the invention will appear hereinafter.

The above and other objects of the invention are realized in an electrical strain wire gauge forming the instant invention, which is in the form of a transducer consisting of a force summing member, a strain sensitive filament being attached to the force summing member and extending therefrom to a connection between the wire and frame, and means anchoring the connection to the frame, said means permitting separation of said connection from said frame on the imposition of a predetermined strain on said wire by the force summing member. On separation of the connection from the frame, the connection has limited movement with respect to the frame. The means anchoring said connection to the frame and permitting such separation may be, for example, a magnetic or a mechanical spring. In one form of the invention cooperating magnetic means are located on said connection and frame such that said connection is held in fixed position with respect to said frame during variation in tension of said filament below a predetermined limit of strain in the wire due to motion of said force summing means, and when said strain limit is reached, said connection moves with respect to said frame to prevent further strain on said filament.

In the above mentioned form of the invention, the anchored but movable connection between the frame and the strain wire filament is a magnet having one or more insulated pins connected thereto, the strain wire being connected to said pin or pins. This magnet with the pins connected thereto is mounted in the frame for limited movement in the line of movement of the force summing member. A second magnet is fixedly positioned in the frame adjacent the first movable magnet and in normal operation of the instrument below the limit of strain of the filament, the two magnets are in engagement with each other, due to the force of attraction between these magnets, and said first magnet remains fixed. When movement of the force summing member, in response to an applied force, takes place to a degree placing a strain on the strain wire which is beyond a predetermined limit, the magnets are so designed as to strength, that the resulting strain on the wire overcomes the attractive force between the two magnets, causing the magnets to become disengaged and the pole faces to separate, with the first magnet pulling away from said second fixed magnet. It will be observed that as the pole faces separate the magnetic attractive force falls rapidly. When the force summing means moves back to reduce the strain, the attractive force becomes sufficient to cause the magnets to attract each other and the pole faces to again come into contact for resetting.

In a preferred embodiment of my invention wherein the transducer is in the form of a pressure gauge, I mount a diaphragm designed to transmit the pressures to be measured, on a relatively fixed frame within a case. The diaphragm carries insulated pins, and similar pins are also carried on a ring magnet positioned for limited movement in a bore in the frame. An electrical resistance strain wire is stretched between the pins in a direction substantially parallel to the axis of the diaphragm or in any other direction so that the diaphragm, on deflection, will vary the tension in the strain wire. A complementary second ring magnet is fixedly mounted in the bore of the frame closely adjacent the first ring magnet, the polarity of such magnets being such that they attract each other and the magnets are thus normally held in engagement unless a force is applied to the strain wire in response to movement of the diaphragm, which is in excess of the magnetic attractive force between the magnets, at which time the first magnet moves away from the fixed magnet. I also position a spring and a spring abutment in the frame in such manner that the spring bears against the diaphragm. I may thus by adjusting the spring vary the spring bias on the diaphragm and thus the tension on the strain wire.

The invention will be more clearly understood by reference to the following description of a preferred embodiment of the invention taken in connection with the accompanying drawings wherein:

Fig. 1 is a vertical section through the transducer taken on line 1—1 of Fig. 2, with parts in elevation;

Fig. 2 is a section taken on line 2—2 of Fig. 1;

Figure 3:
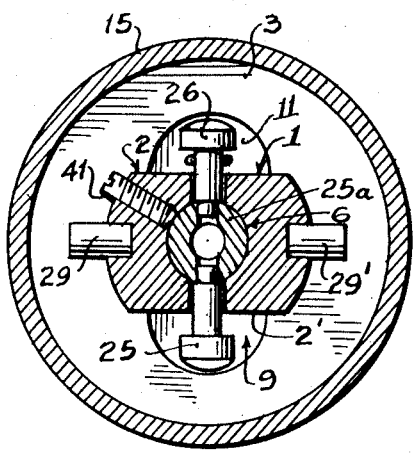
Fig. 3 is a section taken on line 3—3 of Fig. 1.

Referring particularly to Figs. 1 to 5, cylinder frame 1 is squared off at the top and bottom to give parallel faces 2 and 2' and carries circular end flanges 3 and 4. The frame is bored at its ends to give a recess 6 and recess 7 separated by a wall 10. The recess 7 is intercepted by slots 8 and 9 formed in the parallel faces 2 and 2' of the frame. Mounted upon flange 3 is a flexible diaphragm 11 spot welded at its periphery to the flange 3 to give a fluidtight joint. The flange 3 is clamped between the flange 12 of the cap 13, and the flange 16 of the case 15, by means of bolts 17 passing through the flanges 12 and 16. Suitable gaskets 14 and 14' are provided in the bore 16' of the flange 16 to make fluidtight joints.

Secured to the central portion of the diaphragm 11 is a hollow post 18 sealed at its end by an end wall 19. The post 18 sealed at its end by an end wall 19. The post 18 carries two coaxial pins 20 and 21 positioned in the post 18 perpendicular to the axis thereof. The post extends perpendicular to the diaphragm. The post 18 is mounted on a conical boss 22 positioned centrally of the diaphragm. Threaded into a bore in wall 10 is a screw 23 axially aligned with the post 18 and the diaphragm 11 and carrying a spring 24 which bears against the end 19 of the hollow post 21.

A ring magnet 25a having an outer diameter slightly less than the inside diameter of bore 6 of the frame is positioned within said bore adjacent the frame wall 10, the fit of the ring magnet with respect to the walls of said bore being sufficiently loose to permit axial movement of said magnet in the bore. Two coaxial insulated pins 25 and 26 are mounted on diametrically opposite sides of ring magnet 25a by suitable means such as by force fitting the reduced ends 25b of these pins into the magnet, said pins passing through slots 26a in the upper and lower faces 2 and 2' of frame 1. Slots 26a extend longitudinally of the device a sufficient distance to permit limited longitudinal or axial movement of said pins on axial movement of magnetic ring 25a, until the end of magnet 25a strikes the shoulder 26b formed on the interior of wall 10. Pins 25 and 26 are aligned with the pins 20 and 21.

Each of the parallel faces 2 and 2' carries two terminal pins 27 and 28. Mounted on the cylindrical portions of the frame 1, one on each side thereof, are aligned pins 29 and 30, and on the other side are mounted pins 29' and 30' adjacent to each of the flanges 3 and 4. Mounted on one of the circular portions of the frame are terminal pins 31 and 32, and pins 31' and 32' are mounted on the other circular side.

A strain wire 33 is wound in tension between pins 26 and 20 in a loop, one end of the loop terminating at pin 27 and the other end terminating at pin 28 mounted in the same face as pins 26 and 20. Another loop of wire 34 is wound in tension between pins 25 and pin 21, one end of said loop terminating at pin 27 and the other end terminating at terminal pin 28 mounted in the same face as are 25 and 21. A strain wire 35 is looped in tension about pins 29 and 30, one end terminating in pin 32 and the other end of the loop terminating in pin 31. A strain wire 36 is looped in tension between pins 29' and 30', one end of the loop terminating at 31' and the other at 32'. At the flange 3 are two angularly disposed set screws 39 whose ends may be positioned adjacent the conical boss 22 and whose adjustment limits the maximum deflection of the diaphragm 11 to the left as viewed in Fig. 2.

All pins are electrically insulated and the wires are out of contact with the frame. The ends of the four loops 33, 34, 35 and 36 are connected to insulated terminals 37 positioned in cap 38 in a Wheatstone bridge arrangement. The cap 38 is suitably secured on the case 15 by means of bolts 42 passing through cap 38 and a flange 43 at the end of the case. A gasket 44 is clamped between the end of said case and cap 38.

Figure 5:
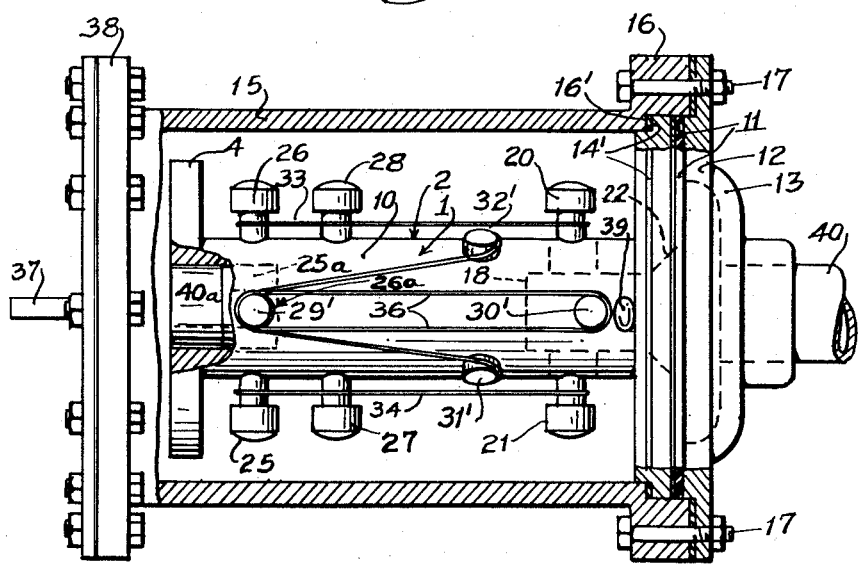
Fig. 5 is a section taken on line 5—5 of Fig. 2.

A second magnetic ring 40a is fixedly mounted within that portion of the bore or recess 6 of frame 1 extending through flange 4. Ring 40a is held against axial movement by a set screw 41 (see particularly Fig. 3) positioned in frame 1. The adjacent pole pieces of ring magnets 25a and 40a have opposite polarity so that movable magnet 25a is attracted to the fixed magnet 40a and is maintained in contact therewith, as seen in Figs. 1, 2 and 5, during normal operation of the device as described below.

In assembling the gauge, with the frame not yet in the case 15 and the cap 13 not yet in place, a post is cemented to the face of the diaphragm opposite to that to which the post 18 is mounted. With the movable magnet 25a maintained in contact with the fixed magnet 40a, the wires are wound in tension between pins 20 and 26 and also between pins 25 and 21. The wires 35 and 36 are also wound on the pins 29 and 30 and also 29' and 30'. The wire ends are anchored as described above. The cemented post is then removed from the diaphragm. The tension in the wires draws the diaphragm to bow the diaphragm toward the flange 3 away from the neutral, i.e. undeflected position of the diaphragm. The set screws 39 having been adjusted, the screw 23 is adjusted to bring the diaphragm to neutral position. The bore 6 permits of the insertion of a tool for this purpose. The strength of the magnets 25a and 40a is such as to continue to maintain them in touching engagement under this adjusted tension of the wires. The frame is then secured in the case 15 and clamped between the flanges 16 and 12 by means of bolts 17. It will be seen that the spring is thus adjusted so that it balances the tension in the wires. By adding the stiffness of the spring 24 to the stiffness of the diaphragm to balance the tension in the wires, I may employ a more flexible diaphragm than could be permissible for like stress in the wires if the spring bias were omitted.

In the embodiment shown, all of the wires 33, 34, 35 and 36 may have the same initial tension applied thereto, or wires 33 and 34 can have equal tension, and wires 35 and 36 equal but different tension from that in wires 33 and 34. Preferably the tension on the wires, particularly wires 33 and 34, at the zero position is one-half or less of the tension at the design limit and at which value further strain is prevented according to the instant invention as pointed out in the following description of operation of my device.

It will be seen that the deflection of the diaphragm 11 outwardly, by fluid pressure introduced through port 45 into the interior of the instrument, as where a vacuum is imposed on 40 will cause the post 18 to move outwardly against the tension of spring 24, causing the pins 20 and 21 to be moved in the slots 8 and 9. Since the magnet 25a is held against magnet 40a at this time, pins 25 and 26 remain stationary and the tension in wires 33 and 34 will increase. Pins 29, 29', 30 and 30' all being stationary, the tension in the wires 35 and 36 is unaffected by the deflection of the diaphragm. This change in tension and resistance of wires 33 and 34 will result in an output from the bridge circuit proportional to such change and the movement of diaphragm 11 responsive to the pressure applied thereto by the pressure fluid.

Figure 4:
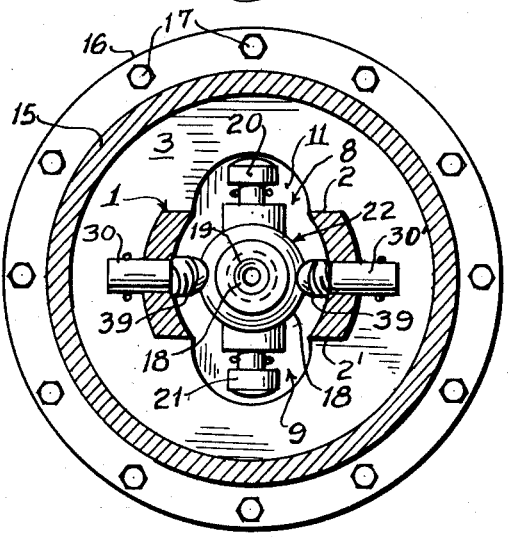
Fig. 4 is a section taken on line 4—4 of Fig. 1.

When the pressure applied to the inside face of diaphragm 11 attains a magnitude causing outward deflection of the diaphragm to a degree producing a tension on wires 33 and 34 equal to the maximum safe tension for which the wires are designed, the magnets 25a and 40a are so designed as to strength that the total tension on wires 33 and 34 will pull magnet 25a away from magnet 40a, there being sufficient clearance between the end of frame wall 10 and the adjacent end of ring magnet 25a to permit the latter to move to the right as viewed in Figs. 1, 2 and 4, carrying pins 25 and 26 in the same direction. This immediately lowers the tension in wires 33 and 34 to a value well below the safe limit of tension thereof. Reduction of the pressure on the diaphragm causes a reduction in deflection of the diaphragm and an inward movement thereof. This reduces the strain on the wires and the force of attraction between the magnets is sufficiently great to cause magnet 25a to move back into engagement with magnet 40a to reset the instrument.

It is seen that the instrument shown in the drawings can be advantageously employed as a pressure gauge, e.g. for measuring pressures below atmospheric, by removing connection 46 to permit maintenance of atmospheric pressure within the instrument and against the inner face of the diaphragm 11 while introducing the lower pressures to be measured through entrance port 40 in cap 13. Higher, e.g. liquid, pressures above atmospheric may be measured employing the embodiment shown, by introducing a liquid whose pressure is to be measured through connection 46 and port 45 into the interior of the instrument. Since different pressures can be applied to opposite sides of diaphragm 11, the instrument can also be employed, by proper calibration, as a differential pressure gauge. In all cases, however, the pressure applied to the inner or left side of the diaphragm, as viewed in Fig. 1, must be greater than that applied to the opposite face of the diaphragm for proper functioning of the device and the novel overload prevention feature thereof. Should the pressure applied through entrance 40 to the right side of diaphragm 11 be at any time greater than the pressure on the other side of the diaphragm, injury to the diaphragm can be prevented by contact of the diaphragm with stops 39 if the applied pressures becomes excessive. If desired, stops such as 39 can be provided on the other or right hand side of the diaphragm to prevent injury to the latter by excessive pressures applied through port 45 to the interior of the instrument and to the left side of diaphragm 11 as seen in Fig. 2.

Figure 6:
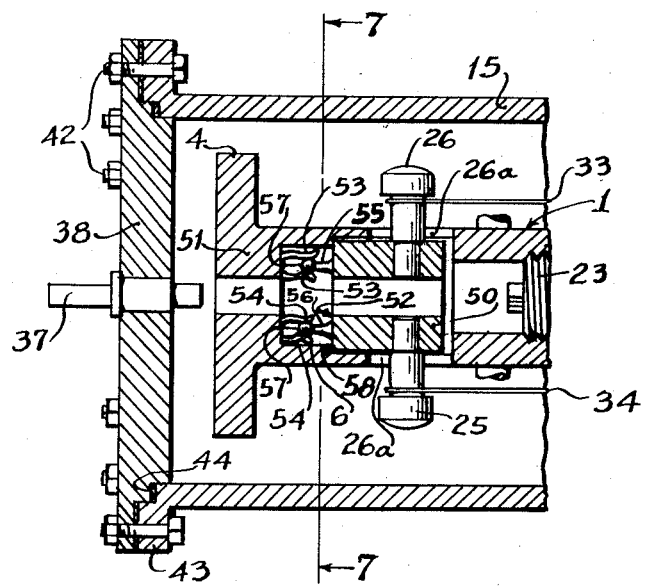
Fig. 6 is a partial sectional view of a modification of the device of Figs. 1 to 5.
Figure 7:
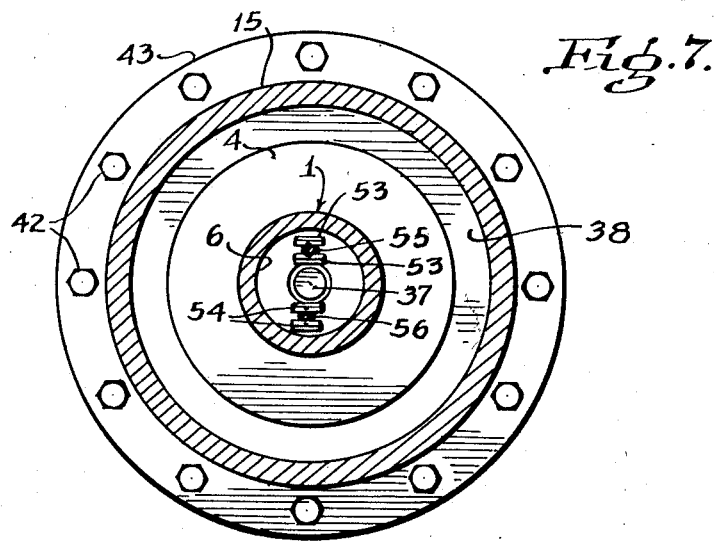
Fig. 7 is a vertical section taken on line 7—7 of Fig. 6.

In Fig. 6 is illustrated a modification of the invention employing an alternative type of anchoring means permitting separation between the pin connection and frame at the predetermined safe strain limit of the wire connected to the pin. The pins 25 and 26 are connected to a ring 50 slidably positioned in bore 6 of frame 1 in a manner similar to ring magnet 25a. The frame 1 has an inner flange 51 thereon disposed opposite the outer end 52 of ring 50. Connected to flange 51 are a pair of curved springs 53 bent inwardly toward each other, and another pair of similar springs 54 are connected to flange 51 at a diametrically opposite position from springs 53. A pair of short rods 55 and 56, each having an enlarged outer end 57, are connected to the outer end 52 of the ring 50 at diametrically opposed positions in line with springs 53 and 54. In the normal anchored position of ring 50 with respect to frame 1, the enlarged head 57 of rod 55 is gripped by springs 53, the tension in which locks head 57 of this rod in fixed position, and in a similar manner head 57 of rod 56 is gripped by springs 54. The tension on springs 53 and 54 is such that when the diaphragm 11 moves to a degree producing the maximum safe strain on wires 33 and 34, enlarged end 57 of rods 55 and 56 will slide out from between the springs, and said rods will no longer be held in fixed position by the springs. Ring 50 carrying pins 25 and 26 will thus move to the right as viewed in Fig. 6, immediately reducing the strain on wires 33 and 34 below said safe strain value. In this modification, the instrument is reset by hand with the rods 55 and 56 again anchored by means of springs 53 and 54, and the outer end of ring 50 abutting shoulder 58 on frame 1, said shoulder serving as a limiting stop for ring 50.

It will be understood that instead of employing a diaphragm 11 as a force summing means, I may employ a rod and thereby transform the instrument into a displacement measuring device, or I can replace the diaphragm 11 by a weight and the instrument thus employed as an accelerometer or velocimeter. In any case, it is seen from the foregoing that I have designed a strain wire transducer including efficient and reliable means for preventing overload of the strain wire and eliminating the stops heretofore employed by the prior art for this purpose.

This application is a continuation-in-part of my U.S. applications Serial No. 354,294, filed May 11, 1953, now Patent No. 2,751,476, and Serial No. 502,663, filed April 20, 1955, now Patent No. 2,760,037.

While I have described a particular embodiment of my invention for the purpose of illustration, it should be understood that various modifications and adaptations thereof may be made within the spirit of the invention as set forth in the appended claims.

I claim:

1. A motion sensing device comprising a frame, a force summing member, a wire mounting connected to said member, an electrical resistance strain wire connected to said wire mounting, a connection between said wire and said frame, and means anchoring said connection to said frame, said means permitting separation of said connection from said frame only on the imposition of a predetermined maximum strain on said wire by said force summing member.

2. A motion sensing device comprising a frame, a force summing member, a wire mounting connected to said member, an electrical resistance strain wire connected to said wire mounting, a connection between said wire and said frame, and magnetic means anchoring said connection to said frame, said magnetic means permitting separation of said connection from said frame on the imposition of a predetermined strain on said wire by said force summing member.

3. A motion sensing device comprising a frame, a force summing member, a wire mounting connected to said member, an electrical resistance strain wire connected to said wire mounting, a connection between said wire and said frame, and spring means anchoring said connection to said frame, said spring means permitting a separation of said connection from said frame on the imposition of a predetermined strain on said wire by said force summing member.

4. A motion sensing device comprising a frame, a force summing member, a wire mounting connected to said member, an electrical resistance strain wire connected to said wire mounting, a connection between said wire and said frame, and cooperating means on said connection and said frame, said means anchoring said connection to said frame and permitting separation of said connection from said frame only on the imposition of a predetermined maximum strain on said wire by said force summing member.

5. A transducer comprising a frame, a force summing member, a wire mounting connected to said member, an electrical resistance strain wire connected to said wire mounting, a connection between said wire and said frame, and a fixed member mounted on said frame adjacent said connection, said connection and said last named member being magnetized and magnetically attracted to each other to anchor said connection to said frame, the strength of said magnetic attraction being such as to permit separation of said connection from said fixed member on the imposition of a predetermined strain on said wire by said force summing member.

6. A transducer comprising a case including therein a frame, a force summing member, a wire mounting connected to said member, an electrical resistance strain wire connected to said wire mounting, a connection between said wire and said frame, and cooperating means on said connection and said frame, said means anchoring said connection to said frame and permitting separation of said connection from said frame only on the imposition of a predetermined maximum strain on said wire by said force summing member, and a fluid in said case.

7. A transducer comprising a frame, a force summing member, a wire mounting connected to said member, a first magnet mounted in said frame, an insulated pin connected to said magnet, an electrical resistance strain wire connected to said wire mounting and said pin, and a second magnet fixedly positioned in said frame adjacent said first magnet, said first magnet being attracted to and held in contact with said second magnet, the attractive force between said magnets being such that the pole pieces of said magnets separate only on the imposition of a force at least equal to that producing a predetermined strain on said wire, said first magnet and said pin when so separated from said second magnet having limited movement in the direction of movement of said force summing member.

8. A transducer comprising a frame, a diaphragm mounted on said frame, a wire mounting connected to said diaphragm, a first magnet mounted in said frame, an insulated pin connected to said magnet, an electrical resistance strain wire connected to said wire mounting and said pin, said wire extending substantially parallel to the line of movement of said diaphragm, and a second magnet fixedly positioned in said frame adjacent said first magnet, said first magnet being attracted to and held in contact with said second magnet, the attractive force between said magnets being such that the pole pieces of said magnets separate only on the imposition of a force at least equal to that producing a predetermined strain on said wire, said first magnet and said pin when so separated from said second magnet, having limited movement in the direction of movement of said diaphragm.

9. A transducer comprising a frame, a diaphragm mounted on said frame, a wire mounting connected to said diaphragm, an electrical resistance strain wire connected to said wire mounting, a connection between said wire and said frame, cooperating means on said connection and said frame, said means anchoring said connection to said frame and permitting separation of said connection from said frame only on the imposition of a predetermined maximum strain on said wire by said diaphragm, said connection when so separated having limited movement with respect to said frame, a spring mounted in said frame, said spring being connected to said diaphragm, and means for adjusting said spring.

10. A transducer comprising a case including therein a frame, a diaphragm mounted on said frame, a wire mounting connected to said diaphragm, a first magnet mounted in said frame, an insulated pin connected to said magnet, an electrical resistance strain wire connected to said wire mounting and said pin, said wire extending substantially parallel to the line of movement of said diaphragm, and a second magnet fixedly positioned in said frame adjacent said first magnet, said first magnet being attracted to and held in contact with said second magnet, the attractive force between said magnets being such that the pole pieces of said magnets separate only on the imposition of a force at least equal to that producing a predetermined strain on said wire, said first magnet and said pin when so separated from said second magnet, having limited movement in the direction of movement of said diaphragm, a spring mounted in said frame, said spring being connected to said diaphragm, means for adjusting said spring, and a fluid in said case.

11. A transducer comprising a case including therein a frame, a flange at one end of said frame, a diaphragm mounted on said flange, a bore in the other end of said frame, a wall in said frame at the end of said bore, a screw mounted in said wall, a post axially mounted on said diaphragm on the side adjacent said wall, a spring mounted on said screw and abutting said post, pins mounted on said post, a first magnet mounted in said bore, insulated pins mounted on said magnet, said last named pins being in alignment with the pins on said post, strain wire looped in tension between the pins on said post and the pins on said magnet, a second magnet fixedly mounted in the bore of said frame adjacent said first magnet, said first magnet being attracted to and held in contact with said second magnet, the attractive force between said magnets being such that the pole pieces of said magnets separate only on the imposition of a force at least equal to that producing a predetermined strain on said wire, said first magnet and the pins thereon when so separated from said second magnet, having limited movement in the direction of movement of said diaphragm.

12. A transducer comprising a frame, a force summing member, a wire mounting connected to said member, an electrical resistance strain wire connected to said wire mounting, a connection between said wire and said frame, an insulated pin mounted on said connection, said wire being connected to said pin, a fixed member mounted on said frame adjacent said connection, a spring mounted on said fixed member, said spring holding said connection in fixed position, said spring releasing said connection and permitting a separation and movement of said connection away from said fixed member on the imposition of a predetermined maximum strain on said wire by said force summing member.

13. A transducer comprising a frame, a diaphragm mounted on said frame, a wire mounting connected to said diaphragm, an electrical resistance strain wire connected to said wire mounting, a connection between said wire and said frame, an insulated pin mounted on said connection, said wire being connected to said pin, a fixed member mounted on said frame adjacent said connection, a spring mounted on said fixed member, said spring holding said connection in fixed position, said spring releasing said connection and permitting a separation and movement of said connection away from said fixed member on the imposition of a predetermined maximum strain on said wire by said diaphragm, the movement of said connection and said pin when so separated from said fixed member being limited.

14. A transducer comprising a frame, a diaphragm mounted on said frame, a wire mounting connected to said diaphragm, a movable member mounted in said frame, said member being movable a limited distance in a direction perpendicular to the plane of said diaphragm, an insulated pin connected to said movable member, an electrical resistance strain wire connected to said wire mounting and said pin, said wire extending substantially parallel to the line of movement of said diaphragm, a fixed member mounted on said frame adjacent said movable member, a spring mounted on said fixed member, said spring holding said movable member in fixed position, said spring releasing said movable member and permitting a separation and movement of said movable member away from said fixed member on the imposition of a predetermined maximum strain on said wire by said diaphragm.

15. A transducer comprising a case including therein a frame, a diaphragm mounted on said frame, a wire mounting connected to said diaphragm, a movable member mounted in said frame, an insulated pin connected to said movable member, an electrical resistance strain wire connected to said wire mounting and said pin, said wire extending substantially parallel to the line of movement of said diaphragm, a fixed member mounted on said frame adjacent said movable member, a spring mounted on said fixed member, said spring holding said movable member in fixed position, said spring releasing said movable member and permitting a separation and movement of said movable member away from said fixed member on the imposition of a predetermined maximum strain on said wire by said diaphragm, said movable member and said pin when so separated from said fixed member, having limited movement in the direction of movement of said diaphragm, a second spring mounted in said frame, said second spring being connected to said diaphragm, means for adjusting said second spring, and a fluid in said case.

16. A motion sensing device comprising a frame, a force summing member, a wire mounting connected to said member, an electrical resistance strain wire connected to said wire mounting, a connection between said wire and said frame, and means releasing the tension on said wire in response to a predetermined upper limit of strain on said wire.

17. A transducer comprising a frame, a diaphragm mounted on said frame, a wire mounting connected to said diaphragm, an electrical resistance strain wire connected to said wire mounting, a connection between said wire and said frame, an insulated pin mounted on said connection, said wire being connected to said pin, and means for moving said connection and releasing the tension on said wire in response to a predetermined upper limit of strain on said wire.

References Cited in the file of this patent

UNITED STATES PATENTS

| | | |
|---|---|---|
| 2,440,706 | Tint | May 4, 1948 |
| 2,789,192 | White | Apr. 6, 1957 |

FOREIGN PATENTS

| | | |
|---|---|---|
| 695,755 | Great Britain | Aug. 19, 1953 |